June 3, 1930.  P. S. MARTIN  1,760,878
THERMOSTAT
Filed July 16, 1925  2 Sheets-Sheet 1
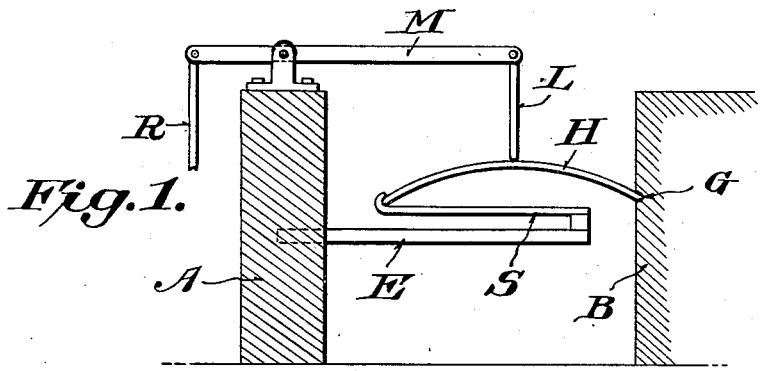
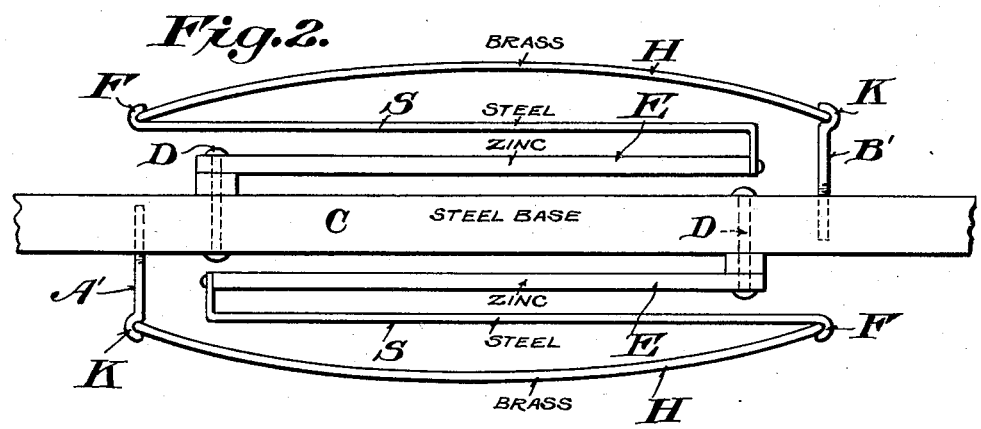
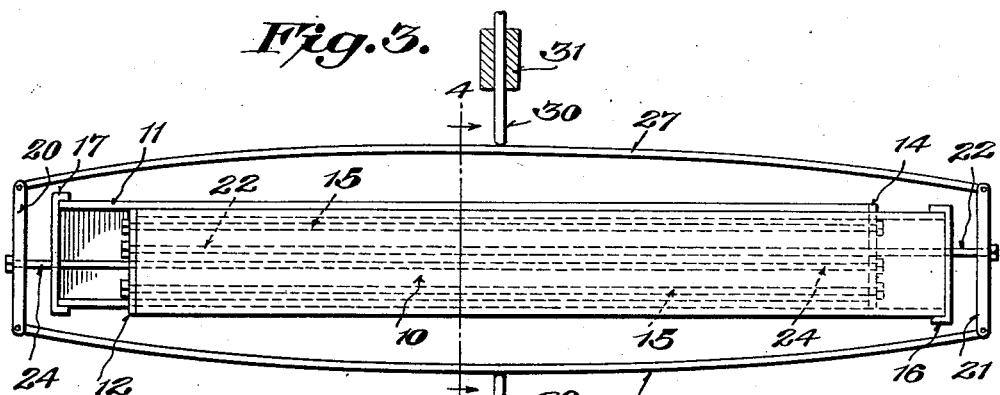
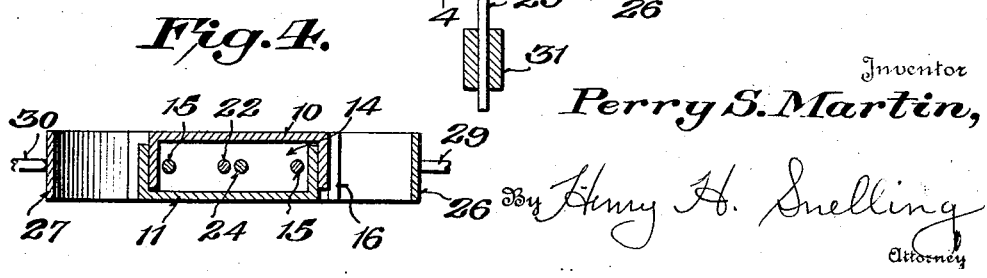
Inventor
Perry S. Martin,
By Henry H. Snelling
Attorney

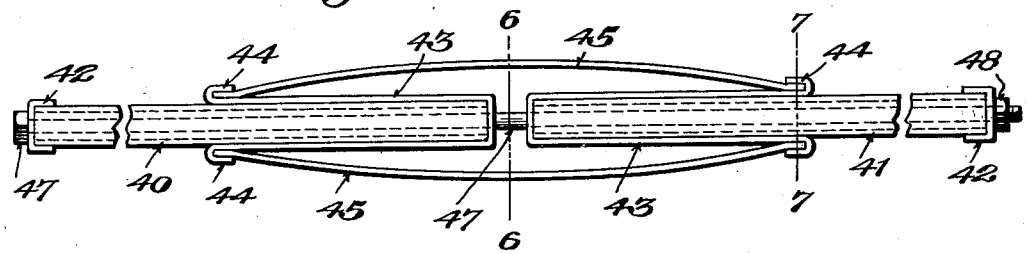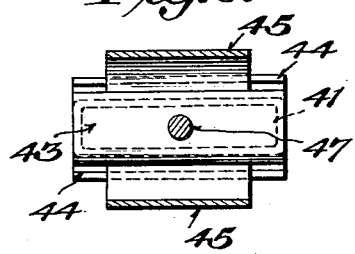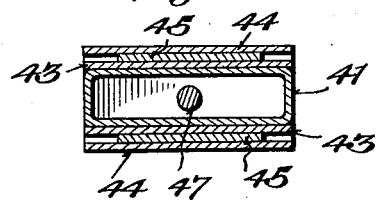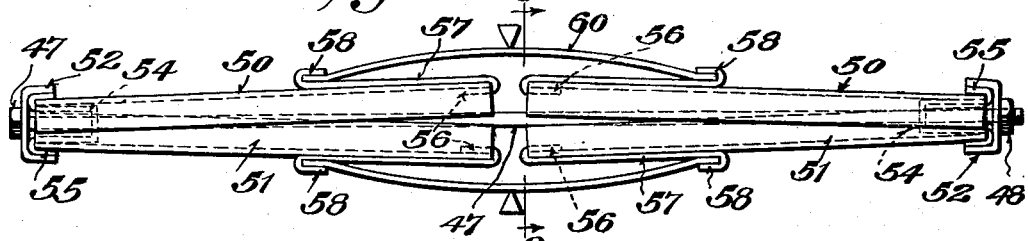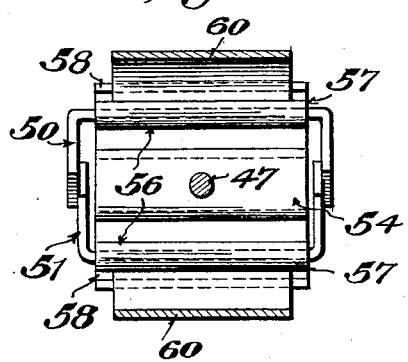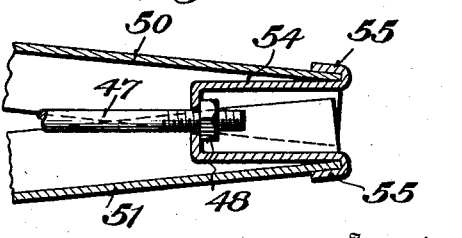
Inventor
Perry S. Martin,
By Henry H. Snelling
Attorney Patented June 3, 1930

1,760,878

UNITED STATES PATENT OFFICE

PERRY S. MARTIN, OF HARRISONBURG, VIRGINIA

THERMOSTAT

Application filed July 16, 1925. Serial No. 44,045.

This invention relates to thermostats and has for its principal object the provision of a thermostat suitable for use where quite direct adjustment is desired.

A further object of the present invention is the provision of a thermostat utilizing the bowing of a metal strip in which, with increased heat, the supports of the bowed elements are drawn together thus increasing the lateral movement of the center of the bowed strip.

A still further object of the invention is the provision of a thermostat utilizing a plurality of expansible bars so held that their free ends will expand in opposite directions and in which said expansion will draw together the supports of a bowed member which bowed member may also be an element having a fairly large coefficient of heat expansion whereby the amount of lateral bowing will be the sum of the expansion of both members.

In a number of different arts a direct thermostat is desired and in many cases it is quite important that the thermostat shall act quickly upon a very small change in temperature and it is important above all things that these thermostats shall operate with extreme consistency. As an example of the use of such thermostat I mention incubator structure as while obviously suitable for many other uses my invention is primarily intended for the production of a thermostat suitable for use in incubators where the permissible range of temperature is very low.

In the drawings:—

Figure 1 shows the principle of the invention in its simplest form.

Figure 2 shows a simple structure illustrating the spirit of the invention with the use of opposed bowed elements.

Figures 3 and 4 are a plan view and cross section respectively of one form of my invention.

Figures 5 and 6 show slightly modified commercial forms.

Figure 7 is a section on line 7—7 of Figure 5.

Figure 8 is a modified form of the invention.

Figure 9 is a section on line 9—9 of Figure 8.

Figure 10 is a detailed section showing the clip on the rod for securing the expansion tubes.

In the simplest form of the invention as shown in Figure 1 there are two supports A and B, from one of which extends an expansion member such as E which is secured to A and extends toward B. At the free end of E a member S is secured and this link member preferably runs directly backward parallel to E, ending with the anchor or hook F a short distance away from the support A, or, to be more exact, the length of the element S is such that it will just clear the support A when the expansion element E is chilled to the greatest extent, i. e., to the lowest temperature, to which it will be subjected. In the wall or support B, there is a second or fixed anchor G in the form of a notch or recessed portion adapted to permanently receive one end of the flexible bowed element H, while the other end of this bowed element H is permanently retained within the hook F.

The anchor G is fixed and the distance between A and B is fixed. The anchor F however, moves toward the anchor G if the element E has a greater coefficient of expansion than the link element S, which is the case, E being preferably of forged zinc for example, which expands 1/50 of an inch per 100 feet for each degree of increase in temperature, and the link element being of invar, platinum, glass, porcelain, steel or other material having a low rate of expansion. The bowing element H may be of steel in which case as the element E expands the center of H will bow upwardly in direct ratio to the closing in of the anchor F toward the fixed anchor G irrespective of the temperature of the element H. It would naturally be preferable to make the bowing element of a material which itself had a high coefficient of expansion as in such structure the amount of lateral, or in this case, upward movement of the center of the bowing element H would be increased, over and above the amount caused by the reduced distance between the two anchors, by the amount of bowing caused by the linear expansion of the sheet or strip H and consequently I preferably make this sheet of such a material as spring brass so that it may readily force up the link L connected to the lever M so as to cause downward movement of the rod R which may operate any desired element to be under the control of the temperature in the neighborhood of the expansive element E.

In the diagrammatic, simple form shown in Figure 2 the two bases are replaced by a single base member C, one end of which is the equivalent of the support A and the other end is equivalent to the support B. As shown, there are two expansive elements E each secured as diagrammatically illustrated, by a bolt D to the steel base C, each zinc expansive element having at its far end a link element S also of steel and forked as at F to form a rounded hook or jaw in which is pivotally received the rounded end of the spring brass bowing strip H, the other end of which is similarly received in the forked end K of a brace or other support B′ or A′ secured to the steel base C and corresponding to the fixed anchor G of the simpler form. In this device the base may be horizontal or vertical and may be made of steel, as stated, or obviously of glass, porcelain or any other material.

As the device as a whole is subjected to increase of temperature, the base and the link elements S expand but slightly while the main or primary elements E expand at a rather high rate which has the effect of drawing the movable anchors F toward the fixed anchors K increasing the amount of bowing of the flexible bowing elements H, and if these are of brass as preferred, the increase in temperature extends these elements as well, so that a very considerable amount of bowing may be had with a slight change in temperature and the increase in distance apart of the centers of the two bowing elements H is utilized to operate a damper, switch, valve or any other controlled element.

In the form shown in Figures 3 and 4, the primary expansion members 10 and 11 are each preferably channel shaped and of exactly similar size whereby in nesting, one of the side flanges of each is between the two side flanges of the other channel member. I find it convenient to make the two channels of zinc as this metal has a quite high coefficient of linear expansion.

One of the channels 10 is closed by a steel clip 12 and the opposite end of the member 11 is closed by a similar steel clip 14. These two steel clips are rigidly secured to each other by a pair of steel rods 15, steel being chosen for its strength and for its relatively low coefficient of expansion. To the other end of the zinc channel 10 is secured a steel clip 16 and to the other end of the zinc channel 11 a similar steel clip 17 is secured and as near centrally as possible a steel rod passes thru the clip 16 to a steel end piece 20 and thru the clip 17 to a similar steel end piece 21. The length of these rods, that is, the rod 24 rigidly connecting clip 16 and end piece 20 and the rod 24 joining the clip 17 with the other end piece 21, is such that at the hottest temperature to which the thermostat will be subjected, the end pieces 20 and 21 will just clear the end pieces 16 and 17 through which, respectively, the rods 24 and 22 freely slide. Secured in any manner to the end pieces or anchors 20 and 21, but preferably pivoted as illustrated, are strips 26 and 27 of resilient metal preferably of spring brass. It is not necessary that the strips 26 and 27 have a high coefficient of expansion as they will bow outwardly in any event with the structure recited. It is advantageous, however, to have these strips of a metal having in addition to a reasonable degree of strength and resilience, a high coefficient of expansion as this will itself increase the lateral movement and I find spring brass admirably suited but at the same time I wish it distinctly understood that these strips may be made of any metal with either a high coefficient of expansion, a low coefficient of expansion, or a medium one.

When the thermostat has been subjected to an increase in temperature, since the ends held by the clips 12 and 14 are relatively immovable due to the low expansion of the steel rods 15 especially in view of the fact that they are entirely protected against the effect of heat by the channels and the clips, all linear expansion of the channels 10 and 11 result in the increasing of the distance between the clips 16 and 17. These latter being rigidly connected through the non-expanding steel rods 22 and 24 also protected from direct heat by the channels and clips, cause the two end pieces 20 and 21 to approach each other thereby causing simultaneous bowing of the two secondary expansion elements 26 and 27 which engage in any desired manner the device to be worked by the thermostat diagrammatically illustrated by the members 29 and 30 slidable in supporting sleeves 31, these parts being truly diagrammatic and added solely for the convenience of illustration. Obviously the greater the amount of expansion of the zinc channels the greater the separation of the governing mechanisms 29 and 30 and in case of a chilling of the thermostat the contraction of the primary thermostat bars 10 and 11 cause the separation of the end pieces 20 and 21 thereby tending to straighten the secondary thermostats 26 and 27 with a consequent drawing together of the members 29 and 30.

In Figures 5 and 8 I have shown two commercial forms of my thermostats, the former being particularly advantageous where a rather powerful thrust is required and the latter being advantageous where a considerable amount of movement is desired. In the form shown in Figure 5 the primary expansion members 40 and 41 are tubes, preferably rectangular in cross section, and are closed on each end by steel clips 42 and 43, the former being rather short clips while the latter are extended rearwardly on both sides to form anchors 44 for the secondary expansion element 45 of sheet brass or other similar material, altho obviously, as in the other forms, this element 45 may be of steel.

By preference the tubes 40 and 41 are very much longer than the secondary expansion members 45 in order to provide as much exposed space as possible between the anchor 44 and the clip 42 as this is advantageous in incubators where the heat which affects the primary expansion members is radiated heat. Obviously an equivalent method of obtaining large area of affected surface on the primary expansion member would be by making the secondary expansion member narrower and thicker and carrying the anchors further apart. The central rod 47 is preferably headed at one end and threaded at the other and has the usual nut 48 so that a very close adjustment may be made in order that we may obtain at any given temperature any given amount of bowing.

The connections between the rod and the primary expansion members 40 may be loose or tight and this applies equally well to the connection between the anchors 44 and the secondary expansion members 45 but at least one of these joints should be loose in order that when the thermostat is chilled there shall be no stress of any kind on the parts. I find in practice that it is most convenient to have a friction connection between the anchors 44 and the spring elements 45, to make a positive connection at the headed end of the rod and the adjacent clip 42. A further very important feature is that by this provision the nut 48 may be loosened and the thermostats shipped flat and entirely free from stress at any temperature.

The form shown in Figure 8 is similar in general to the form just described and like the other forms contemplates no bending of any kind of the zinc members. The center rod being exactly similar to the rod of the modification shown in Figure 5, is given the same numeral 47. The primary expansion tubes, however, are preferably made each of two pieces, for example, as channels 50 and 51 which may be nested as in Figure 4 but preferably are made with one of the channels, such as 50, wider than the other channel. The end clips 52 are of rather sturdy construction so that neither the head of the rod or bolt nor the nut 48 may bite even slightly into the clip. In this form I have a second steel clip 54 loosely mounted on the rod 47 and having anchor ends 55 embracing the flat body portion of the zinc channels. The center clips 56 are formed of flat sheet metal bent downwardly about the base of the channels, carried reversely as at 57 over the top of the channels and ending in an anchor 58, exactly similar in purpose and effect to the anchors 44.

In this modification the clip 54 acts as a hinge and as primary expansion members, i. e., the zinc channels, expand, they naturally open at the center drawing the two anchors 58 toward one another and causing the spring members 60, whether expansive or not, to take up the bowing at this point, therefore relieving the zinc channels of any tendency toward distortion or even bending and utilizing all of the straight thrust which is added to if the spring members are of brass or other high expansion material as is preferred.

The advantage of this form is that a very slight increase in temperature will give a large amount of movement at the center. It also has the advantage of the modification shown in Figure 5 in that the thermostat may be shipped absolutely flat by releasing the nut 48. In some of the thermostats made in this form it has been found convenient to omit the clip 52 entirely and to seat the head of the rod 47 and the nut within the hollow of the clip 54 but the disadvantage of this is that the wear, even tho very slight, is sufficiently great to require rather frequent adjustment of the position of the nut.

What I claim is:—

1. In an incubator thermostat, two elongated high expansion members in tandem relation, a low expansion rod connecting the distant ends of the two high expansion members, clips extending from the proximate ends of the high expansion members backward toward the ends of the rod, and a spring engaging each clip, said rod serving not only to hold the members assembled but also acting to limit separation of the far ends of the two members.

2. The device of claim 1 in which the two members are tubes, the rod is inside of the tubes and the spring is outside of each tube.

3. The device of claim 1 in which the members are each of two channels nesting to form a tube, the four channels are hingedly connected to the rod which is inside of the two tubes, and in which there are four clips each extending on the outside of one of the four channels, and two springs between the four clips.

4. The device of claim 1 in which one end of the rod is adjustably secured to one member so that by changing such adjustment the amount of lateral movement of the center of the spring can be controlled.

5. In an incubator thermostat, two tandem tubes of high expansion material each consisting of two opposed nesting channels, a low expansion rod thru both tubes, means securing the rod to one end of each of the four channels, and means for connecting the proximate opposed ends of the two channels on each side of the central rod whereby when the device is heated the ends of the channels of each tube, farthest from the rod ends, will separate laterally, while the proximate ends of the tubes approach each other longitudinally.

6. The device of claim 5 in which the connecting means are springs of high expansion material thereby increasing materially the lateral distance between the springs when the incubator temperature increases.

7. The device of claim 5 in which the length of the rod is adjustable whereby the lateral deflection of the connecting means may be altered at any chosen temperature.

In testimony whereof I affix my signature.

PERRY S. MARTIN.